United States Patent
Ritz et al.

(10) Patent No.: US 8,797,914 B2
(45) Date of Patent: Aug. 5, 2014

(54) UNIFIED POLICY MANAGEMENT FOR EXTENSIBLE VIRTUAL SWITCHES

(75) Inventors: Andrew J. Ritz, Sammamish, WA (US); Pankaj Garg, Bellevue, WA (US); Vinod K K L Swamy, Bellevue, WA (US); Nihar Niranjan Shah, Sammamish, WA (US); Attilio Mainetti, Issaquah, WA (US); Edward J. Reed, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 13/229,828

(22) Filed: Sep. 12, 2011

(65) Prior Publication Data

US 2013/0064133 A1  Mar. 14, 2013

(51) Int. Cl.
*H04L 12/66* (2006.01)

(52) U.S. Cl.
USPC .......................................... 370/254

(58) Field of Classification Search
None
See application file for complete search history.

(56) References Cited

U.S. PATENT DOCUMENTS

| | | | |
|---|---|---|---|
| 6,990,656 B2 | 1/2006 | Ersek et al. | |
| 7,428,552 B2 | 9/2008 | Muenkel | |
| 7,546,326 B2 | 6/2009 | Rakoff et al. | |
| 7,941,623 B2 | 5/2011 | Tankleff | |
| 2006/0010131 A1* | 1/2006 | Chisholm et al. | 707/9 |
| 2008/0059556 A1 | 3/2008 | Greenspan et al. | |
| 2009/0070771 A1 | 3/2009 | Yuyitung et al. | |
| 2009/0132804 A1 | 5/2009 | Paul et al. | |
| 2009/0292858 A1* | 11/2009 | Lambeth et al. | 711/6 |
| 2011/0251992 A1* | 10/2011 | Bethlehem et al. | 707/610 |

OTHER PUBLICATIONS

"Hyper-V: Using Live Migration with Cluster Shared Volumes in Windows Server 2008 R2," retrieved from <<http://technet.microsoft.com/en-us/library/dd446679%28WS.10%29.aspx>>, Apr. 27, 2011, 13 pgs.

* cited by examiner

*Primary Examiner* — Minh-Trang Nguyen
(74) *Attorney, Agent, or Firm* — John Jardine; Andrew Sanders; Micky Minhas

(57) ABSTRACT

Systems, methods, and computer storage media are described herein that configure a switch extension associated with a virtual switch with one or more settings. In response to the configuring, the systems, methods, and computer storage media persist the one or more settings and apply the persisted one or more settings to a target switch extension of a target virtual switch. The systems, methods, and computer storage media receive the settings through a management interface. Also, the systems, methods, and computer storage media receive requests for information associated with the switch extension and provide the switch extension information in response.

20 Claims, 6 Drawing Sheets

UNIFIED POLICY MANAGEMENT FOR EXTENSIBLE VIRTUAL SWITCHES

BACKGROUND

With the advent of the Internet and other data networks, the importance of mechanisms enabling communication has grown significantly. Computing devices are typically equipped with network stacks for managing the sending and receiving of network packets, and these stacks are often organized in accordance with one or more protocols. For example, network stacks may conform to the Open Systems Interconnection (OSI) model and include interfaces linking the layers of the OSI model. One example of such interfaces is provided by the Network Driver Interface Specification (NDIS) logical link control. An NDIS logical link control forms the upper sublayer of the OSI data link layer and provides an interface between the data link layer of the OSI model and the network layer of the OSI model.

The NDIS logical link control often includes filter modules, such as NDIS lightweight filters, that act as filters on traffic through the network stack. For example, a filter module of the NDIS logical link control may provide firewall functionality by blocking transmission through the network stack of data packets associated with a specific Internet Protocol (IP) address.

Also, as computing devices have advanced, the use of virtualization has become more prevalent. Many computer systems utilize virtual machines in order to host multiple operating systems on the same device and provide a virtual machine manager (VMM) or hypervisor to act as an interface between the virtual machines of a device and the device's hardware. The VMM or hypervisor often implements a virtual switch to provide networking between virtual machines on the device and between those virtual machines and other devices. In Hyper-V, for example, a parent partition (or root virtual machine) implements the virtual switch and a hypervisor acts as an interface between the device hardware and the virtual machines.

When networking with a device using virtualization, however, the above-described filter modules can only be implemented in the network stack associated with the device drivers of the network interface hardware of the device. Filter modules, such as NDIS lightweight filters, are not designed to be implemented in a virtual stack of a virtual switch or of a virtual network interface. Thus, traditional filter modules can only filter traffic to or from the device, but not intra-device traffic from one virtual machine to another.

SUMMARY

To enable filtering by a virtual switch and other configurations of a virtual switch, the virtual stack of the virtual switch may be enhanced with switch extensions. These switch extensions may be provided by third party application developers, but may lack mechanisms to receive settings or to persist those settings for purposes of live migration, repair, or back-up. To provide these mechanisms, a management interface, serializer/deserializer component of a VMM service, and a virtual switch of a root virtual machine are configured to receive settings, transform those settings, and provide the transformed settings to the switch extensions. Upon successful configuration of the switch extensions, the root virtual machine persists the settings in a configuration file. During live migration, repair, or back-up, the configuration file is applied to a target virtual switch, providing the switch extensions of the target switch with the persisted settings.

In addition to enabling application of settings to target virtual switches, the components of the root virtual machine are also configured to receive requests for information associated with switch extensions, to provide those requests to switch extensions, and to answer the requests with information received from the switch extensions. Such information may include settings and performance metrics of the switch extensions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
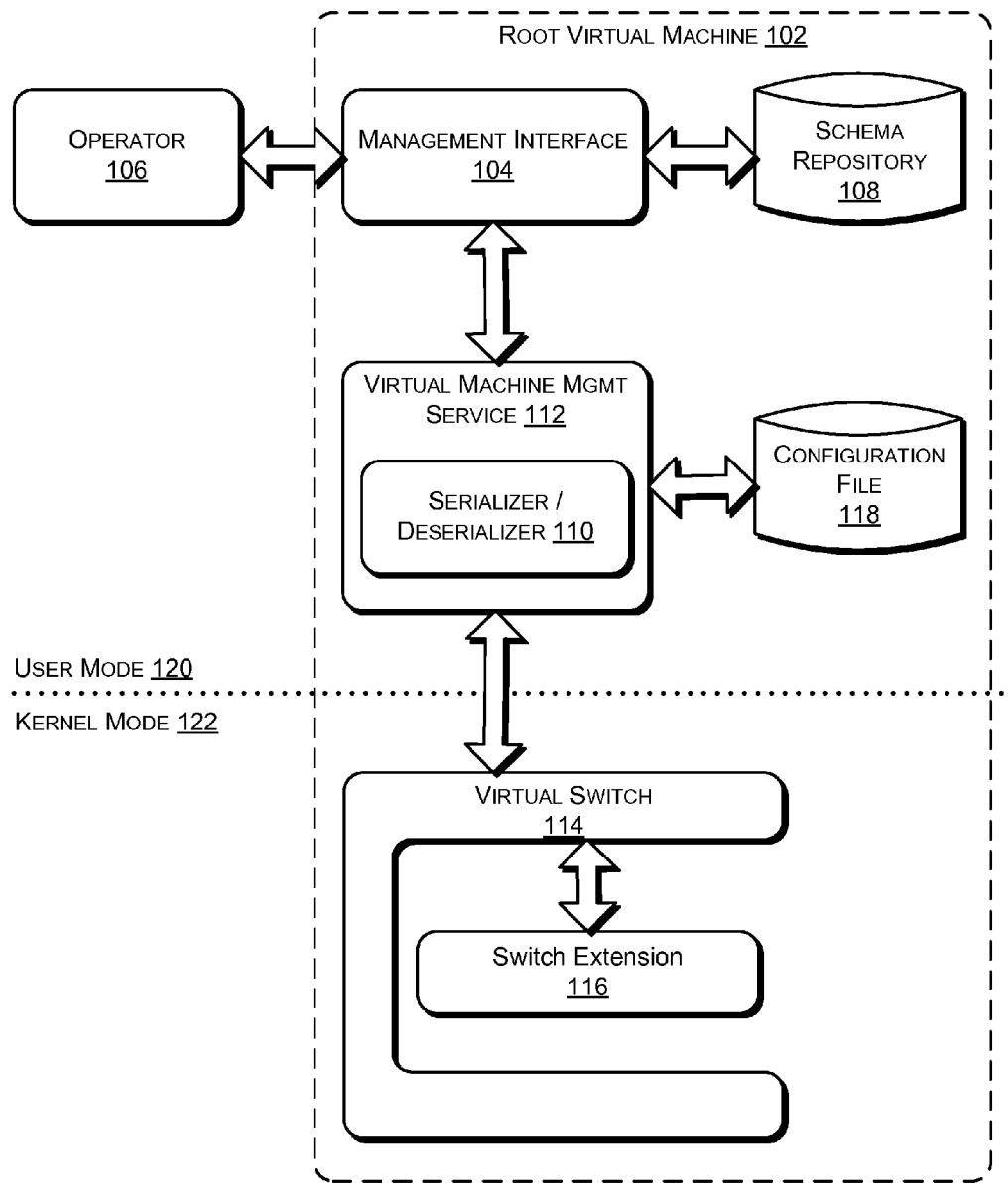
FIG. 1 illustrates an example overview of components of a root virtual machine configured to provide switch extension settings to switch extensions of a virtual switch implemented in the root virtual machine, in accordance with various embodiments.

Described herein are techniques for configuring switch extensions of virtual switches with settings, persisting those settings, and applying the persisted settings to switch extensions of target virtual machines. These techniques are implemented by a root virtual machine, such as the parent partition in Hyper-V. The switch extensions include filter modules implemented in the virtual stack of the virtual switch to filter traffic to or from a virtual machine of the host device. A management interface of the root virtual machine, such as a Windows Management Instrumentation (WMI) interface, receives the settings and may also be configured to receive requests for information associated with switch extensions. Such information could include settings or performance metrics. The management interface provides the settings or request in the form of an object, such as a WMI object, to a serializer/deserializer component of a VMM service. The object may include an identification of a schema, such as a Managed Object Format (MOF) file, that is associated with the switch extension that the settings or request are intended for. The serializer/deserializer component generates a binary representation of the settings or an empty binary representation of the request and provides the binary representation or empty binary representation, along with attributes derived from the schema, to a driver of a virtual switch implemented in the root virtual machine. In some embodiments, the binary representation/empty binary representation and attributes are provided using a device input/output control (IOCTL) call to the driver. The driver then packs the binary representation/empty binary representation and attributes into a structure, such as a C structure, a NDIS structure, or some other data structure, and provides the structure to the switch extension. In some embodiments, the structure is provided using an object identifier (OID) request.

In various embodiments, when the provided structure includes a binary representation of settings and the switch extension indicates that it has been successfully configured with the settings, the VMM service or another component of the root virtual machine persists the settings in a configuration file, such as a virtual machine configuration file. The configuration file is then used in subsequent operations, such as live migrations, repairs, or back-ups, to configure a switch extension of a target virtual switch.

In further embodiments, when the provided structure includes an empty binary structure that corresponds to a request, the switch extension may populate the empty binary structure with the requested information and return a structure including the populated binary representation to the driver of the virtual switch. The driver of the virtual switch then unpacks the populated binary representation and attributes and provides them to the serializer/deserializer component. The serializer/deserializer component then deserializes the populated binary representation into an object and provides the object to the management interface. The management interface then answers the request for information based on the contents of the object.

Example Overview

FIG. 1 illustrates an example overview of components of a root virtual machine configured to provide switch extension settings to switch extensions of a virtual switch implemented in the root virtual machine, in accordance with various embodiments. As shown in FIG. 1, a root virtual machine 102 of a host device includes a management interface 104 to communicate with an operator 106. The operator 106 provides settings or requests for information through the management interface 104, those settings or that request identifying a schema stored in a schema repository 108. The management interface 104 provides the settings or requests to a serializer/deserializer component 110 of a VMM service 112 and receives the requested information from the serializer/deserializer component 110. The serializer/deserializer component 110 serializes the settings or requests into binary representations and provides the settings or requests to a virtual switch driver of a virtual switch 114. The serializer/deserializer component 110 also deserializes the requested information received from the virtual switch driver. The virtual switch driver of the virtual switch 114 packs the binary representations of the settings into structures to provide to the switch extension 116 and unpacks the binary representations of the information from structures received from the switch extension 116. Upon successfully configuring the switch extension 116, the root virtual machine 102 persists the settings in a configuration file 118. A number of components of the root virtual machine 102 belong to the user mode 120 of the host device, and other components belong to the kernel mode 122 of the host device.

Figure 6:
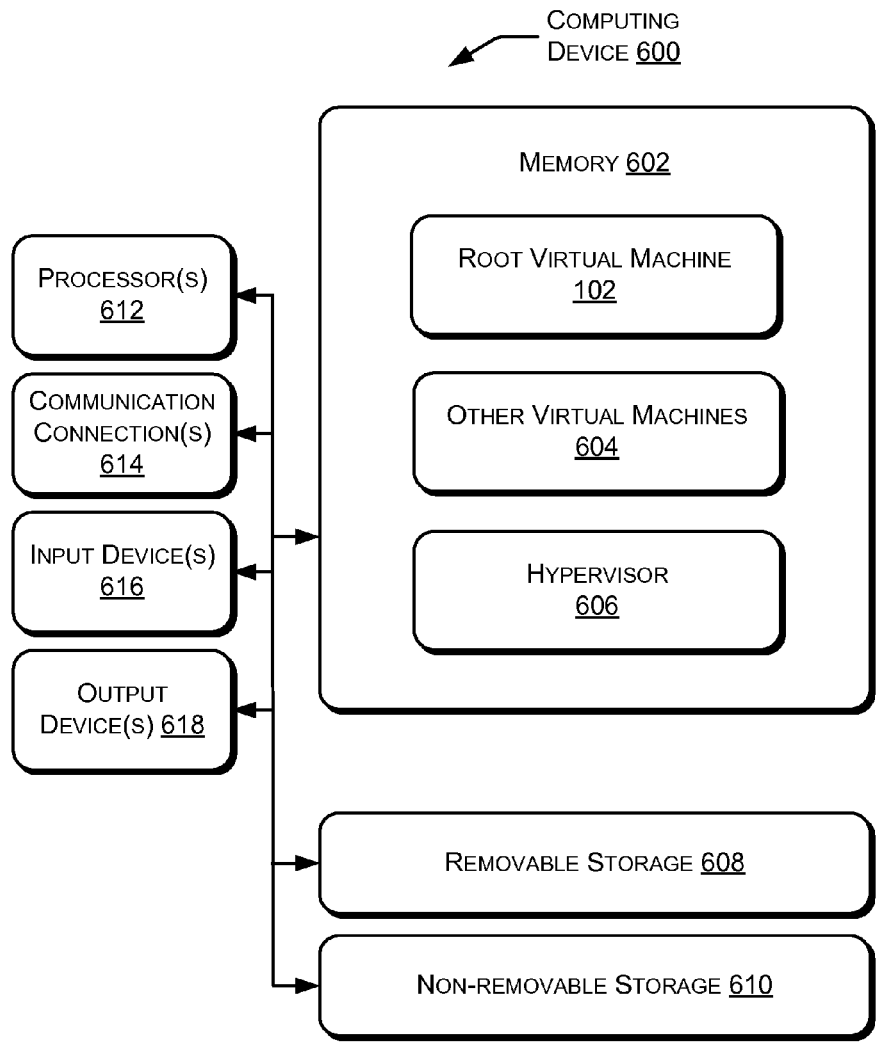
FIG. 6 is a block diagram of an example computer system architecture of a host computing device that includes the root virtual machine, a hypervisor, and one or more other virtual machines, in accordance with various embodiments.

In various embodiments, the host device may be any sort of computing device or computing devices. For example, the host device may be or include a personal computer (PC), a laptop computer, a server or server farm, a mainframe, a tablet computer, a work station, a telecommunication device, a personal digital assistant (PDA), or any other sort of device or devices. In one implementation, the host device represents a plurality of computing devices working in communication, such as a cloud computing network of nodes. When implemented on multiple computing devices, the computing device 102 may distribute the root virtual machine 102 on one or more of the devices and other virtual machines among others of the multiple devices. An example host device is illustrated in FIG. 6 and is described below in greater detail with reference to that figure.

In some implementations, a network or networks may connect multiple devices represented by the host device, as mentioned above. The network or networks may also connect the host device to one or more other devices. The network or networks may be any one or more networks, such as wide area networks (WANs), local area networks (LANs), or the Internet. Also, the network or networks may be public, private, or include both public and private networks. Further, the network or networks may be wired, wireless, or include both wired and wireless networks. The network or networks may utilize any one or more protocols for communication, such as the Transmission Control Protocol/Internet Protocol (TCP/IP), other packet based protocols, or other protocols.

In various embodiments, as mentioned above, the root virtual machine 102 is a parent partition in Hyper-V. As shown in FIG. 1, the root virtual machine 102 includes the management interface 104, schema repository 108, serializer/deserializer component 110, VMM service 112, virtual switch 114, switch extension 116, and configuration file 118. The root virtual machine 102 may also include other components, such as a virtual network interface, virtual device drivers, etc. In one embodiment, the operator 106 may also be implemented in the root virtual machine 102.

In some embodiments, some components of the root virtual machine 102 are associated with a user mode 120, while others are associated with kernel mode 122. As shown in FIG. 1, the management interface 104, schema repository 108, serializer/deserializer component 110, VMM service 112, and configuration file are associated with the user mode 120, and the virtual switch 114 and switch extension 116 are associated with the kernel mode 122. The user mode 120 and kernel mode 122 may be associated with different protection domains. In one embodiment, the user mode 120 may be associated with a least privileged protection domain and the kernel mode 122 may be associated with a most privileged protection domain.

In various embodiments, the management interface 104 may be or include an application programming interface (API), such as the API of a WMI interface. The management interface 104 enables an operator 106 to provide settings for the switch extension 116 and to request information associated with the switch extension 116. Settings may be provided by invoking a specific function of the management interface 104 and by identifying a schema stored in the schema repository 108. In one embodiment, the same function may be invoked to provide settings of any kind for any switch extension 116, with the identified schema providing particulars of the switch extension 116. In other embodiments, the management interface 104 may include multiple functions to provide settings, each of which may be specific to a group or type of switch extensions 116 or to a particular switch extension 116. The output of these one or more functions is an object, such as a WMI object, that includes the provided settings and an identifier of the schema. In one embodiment, the settings are specified in a Common Information Model (CIM) MOF syntax and associated with a specific base class that is defined by the root virtual machine 102 for providing settings. These specified settings may be received by the management interface 104 through shell or command-line entry, through a form or other user interface, or through a file, such as a text or extensible markup language (XML) file. Such a shell or interface may be provided by the management interface 104, by the operator 106, or by another component.

In some embodiments, the management interface 104 may provide one or more functions for retrieving information associated with the switch extension 116. The one or more functions may comprise a single function for retrieving all information associated with the switch extension 116 (e.g., settings and performance metrics), a single function or group of functions that enable the operator 106 to specify the type of information requested through a request identifier or request type, or functions specific to one or more items of switch extension information. In one embodiment, the request may specify a schema associated with the switch extension 116 to enable the root virtual machine 102 to determine which switch extension 116 the request is directed to. In such an embodiment, the schema identifier serves as a switch extension identifier. Upon receiving the request, the management interface 104 generates an empty object, such as a WMI object, that includes the identifier of the schema/switch extension 116.

Also, in some embodiments, the management interface 104 may receive answers to the requests at one or more functions from the serializer/deserializer component 110. The answers may be provided as WMI objects populated with the requested information. Responsive to receiving the answers, the management interface 104 may provide answers to the responses. Such answers may be provided to an application, file, or user associated with or included in the operator 106.

In various embodiments, the operator 106 represents any source of input to the management interfaces 104. The operator 106 may include one or more modules implemented in a virtual machine of the host device, either in the root virtual machine 102 or in another virtual machine. The operator 106 may also or instead include one or more modules implemented on another device. These modules of the operator 106 enable a user or device to specify the settings or request in the manner described above. They may, for example, provide a command-line, shell, or other user interface. The operator 106 may also include one or more files specifying the settings or a data store of such files to select from and provide to the management interface 104. Further, the operator 106 may include an application that seeks to configure and monitor switch extensions. For example, the operator 106 could include a security program that monitors data connections and traffic of one of the virtual machines of the host device, and the switch extension could be a filter associated with that security program. Such a program could provide settings (e.g., permissible IP addresses to communicate with) and request performance metrics (e.g., number of connections blocked by the switch extension).

In some embodiments, as mentioned above, the settings or requests provided by the operator 106 include an identification of a schema associated with a switch extension 116, and that schema identifier may also serve as an identifier of the switch extension 116. The schema identifiers identify schemas, such as MOF files, stored in the schema repository 108 of the root virtual machine 102. This schema repository 108 may be an example of a MOF file repository or a WMI repository. The schema repository 108 may be any sort of data store, such as a relational database. In one embodiment, the schema repository 108 may instead be located on another virtual machine or device. The schema repository 108 may include at least one schema for each switch extension 116, the schema or schemas defining attributes of the switch extension 116 for which setting values may be provided. The schema or schemas may also specify other metadata of its/their associated switch extension 116. Schemas may be registered in and stored in the schema repository 108 prior to, concurrent with, or after installation of their associated switch extensions 116.

In various embodiments, the object generated by the management interface 104, such as a WMI object, is provided by the management interface 104 to a serializer/deserializer component 110 of a VMM service 112. While the serializer/deserializer component 110 is shown as a single component, the serializer/deserializer component 110 may comprise separate serializer and deserializer components. Upon receiving an object, such as a WMI object including settings or an empty WMI object, the serializer/deserializer component 110 determines if the object is associated with a specific base class, that base class indicating that the object is a settings object or a request. The serializer/deserializer component 110 then serializes the object into a binary representation. This process may include, for example, mapping strings and other value types into bit patterns. In one embodiment, the mapping is based at least partly on information included in the schema that is identified by the object. For empty objects, the serializing may simply involving utilizing a default binary representation. The serializer/deserializer component 110 then provides the binary representation and attributes derived from the schema to the driver of the switch extension 114 via a device IOCTL call or through some other communication type or message.

The serializer/deserializer component 110 also receives binary representations and attributes from the driver of the virtual switch 114. These binary representations and attributes may also be provided via a device IOCTL call and may correspond to a request, representing the information provided in answer to the request. Upon receiving the binary representation and attributes, the serializer/deserializer component 110 deserializes the binary representation into an object, such as a WMI object. This process may include mapping bit patterns to strings and other value types and may be based at least in part on the attributes or on the schema corresponding to the attributes. Upon generating the object from the binary representation, the serializer/deserializer component 110 provides the object to the management interface 104 by, for example, invoking a function of the management interface 104.

Figure 2:
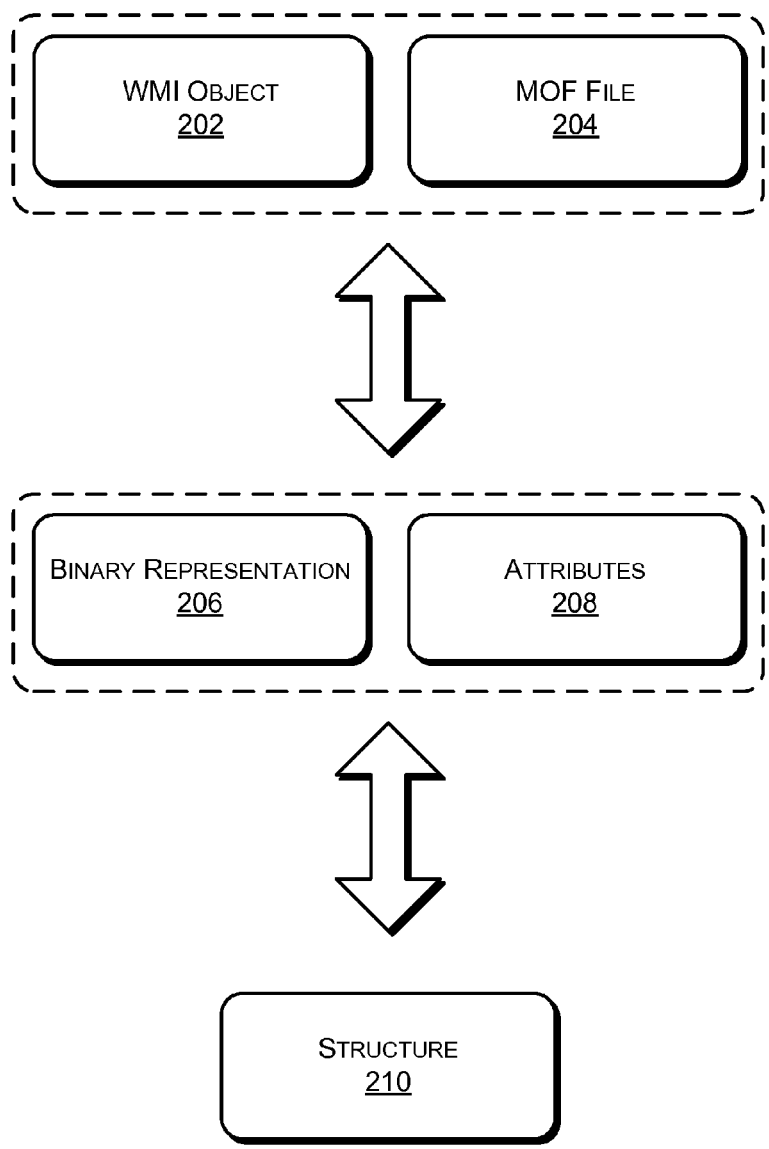
FIG. 2 illustrates data formats for exchanging the switch extension settings or information requests between interfaces, services, and drivers of the root virtual machine, in accordance with various embodiments.

FIG. 2 illustrates an example of input-output pairs received and generated by the operations of the serializer/deserializer component 110. For example, the serializer/deserializer component 110 may receive a WMI object 202 and MOF file 204 as an input pair and serialize the WMI object 202 to generate a binary representation 206 and attributes 208 as an output pair to be provided to the virtual switch driver via a device IOCTL call. As mentioned above, the serializer/deserializer component 110 derives the attributes 208 from the MOF file 204. The serializer/deserializer component 110 may also receive the binary representation 206 and attributes 208 as an input pair via a device IOCTL call and deserializer the binary representation 206 to generate the WMI object 202. The serializer/deserializer component 110 also uses the attributes 208 to identify the MOF file 204.

Referring again to FIG. 1, the VMM service 112 is a component of the root virtual machine 102 that handles one or more management operations of the root virtual machine 102. As shown, the VMM services 112 may include the serializer/deserializer component 110. The VMM service 112 may also include other components to manage or interact with other aspects of the virtual switch 114, with a virtual network interface of the root virtual machine 102, or with one or more other administrative or platform processes. In one embodiment, the VMM service 112 persists the one or more received switch extension setting in response to being notified that configuration of the switch extension 116 was successful. The VMM service 112 persists the settings by updating the virtual machine configuration file 118 to reflect the current settings of the root virtual machine 102, which include settings of the virtual switch 114 and the switch extension 116. This snapshot of the settings comprising the configuration file 118 may be stored in a database, in a file, or in any sort of data structure. In other embodiments, a different component of the root virtual machine 102 persists the one or more settings in the configuration file 118.

In some embodiments, as mentioned above, a driver of the virtual switch 114 receives binary representations and attributes from the serializer/deserializer component 110 via device IOCTL calls and provides binary representations and attributes to the serializer/deserializer component 110 via device IOCTL calls. The driver may act as an interface to the virtual switch 114 for other components of the root virtual machine 102 and other systems. The virtual switch 114 may be any sort of virtual switch, such as the virtual switch of the parent partition utilized in Hyper-V. Such a virtual switch 114 may enable communication between virtual machines on a same host device and between any of those virtual machine and other devices. The virtual switch 114 may also include a virtual stack and an interface enabling application developers to provide switch extensions 116 that plug into the virtual stack as filter modules. In response to an invocation of that interface, an application developer (which could include operator 106) or some other party may provide the switch extension 116. In one embodiment, the interface also enables the application developer to provide a schema, such as a MOF file, which is stored in the schema repository. In other embodiments, the schema is provided separately without involvement of the interface of the virtual switch 114.

The driver of the virtual switch 114 is also configured to pack received binary representations and attributes into a structure, such as a C structure, NDIS structure, or other data structure, and provide the structure to a switch extension 116. In one embodiment, the attributes identify which switch extension 116 that the structure should be provided to. The driver provides the structure to the switch extension 116 by means of a request, such as an OID request. If the provided structure represents a request for information from a switch extension 116, the attributes packed in the structure may identify the type of request or the type of information requested.

In addition to providing a structure to a switch extension 116, the driver of the virtual switch 114 also receives structures from switch extensions. Such a structure may be provided through an OID response to an OID request when the structure provided through the OID request represents a request for information from a switch extension 116. In response to receiving a structure, the driver unpacks the binary representation and attributes and provides the binary representation and, optionally, the attributes, to the serializer/deserializer component 110 through a device IOCTL call.

As shown in FIG. 2, that figure illustrates an example of inputs and outputs pairs received and generated by the operations of the driver of the virtual switch 114. For example, the driver may receive a binary representation 206 and attributes 208 as an input pair and pack the binary representation 206 and attributes 208 into a structure 210 as an output to be provided to the switch extension 116 via an OID request. The driver may also receive the structure 210 as an input via an OID response and unpack the binary representation 206 and attributes 208 from the structure 210 to provide as an output pair to the serializer/deserializer component 110. Also, as mentioned above, in some embodiments, the driver only provides the binary representation 206 to the serializer/deserializer component 110 as an output.

Returning again to FIG. 1, the switch extension 116 is a filter module implemented in the virtual stack of the virtual switch 114 to filter traffic to or from a virtual machine of the host device. As mentioned above, the switch extension 116 may be provided through an interface, such as an interface of the virtual switch 114, or through some other interface of the root virtual machine 102. In some embodiments, switch extensions 116 may have many characteristics of NDIS lightweight filters and may occupy the upper sublayer of the data link layer of the virtual stack, just as NDIS lightweight filters occupy the analogous layer of the network stack. Each switch extension 116 may have zero, one, or more settings that may be configured by the switch extension 116 responsive to receiving an OID request that includes the settings. The switch extension 116 may also be configured to respond to requests for information. The information provided in response may include one or both of settings and performance metrics. Such performance metrics could include, for example, a count of connections blocked by the switch extension 116. In responding to the request, the switch extension 116 populates a binary representation part of a structure with the requested information.

Example Operations

Figure 3:
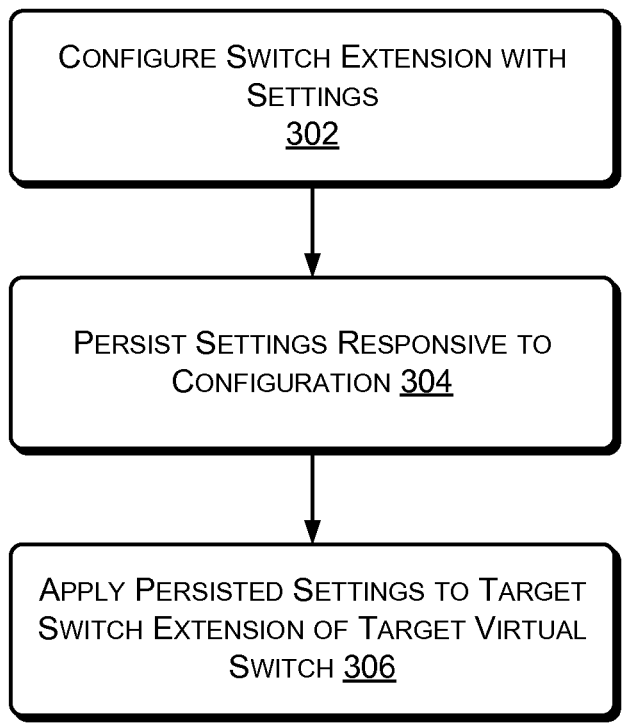
FIG. 3 is a flowchart showing an illustrative process for applying persisted switch extension settings to a switch extension of a target virtual switch, in accordance with various embodiments.
Figure 4:
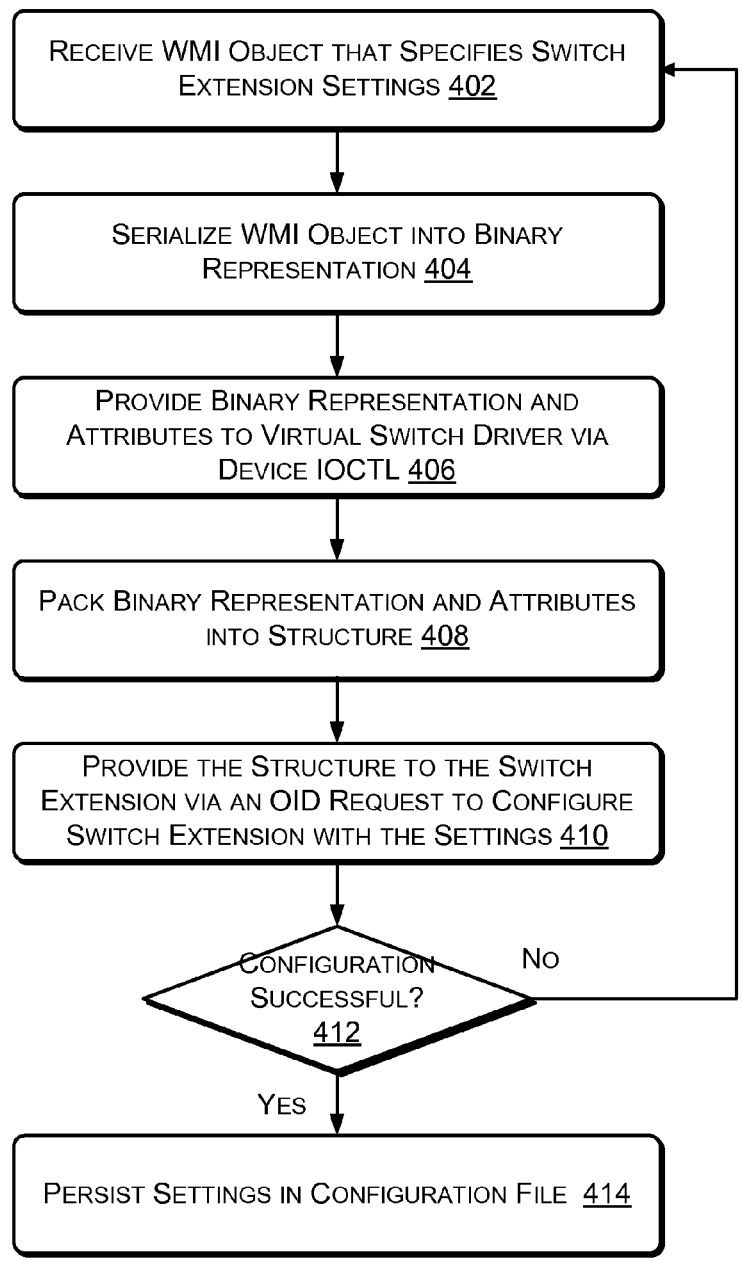
FIG. 4 is a flowchart showing an illustrative process for configuring a switch extension with settings received through a management interface, in accordance with various embodiments.
Figure 5:
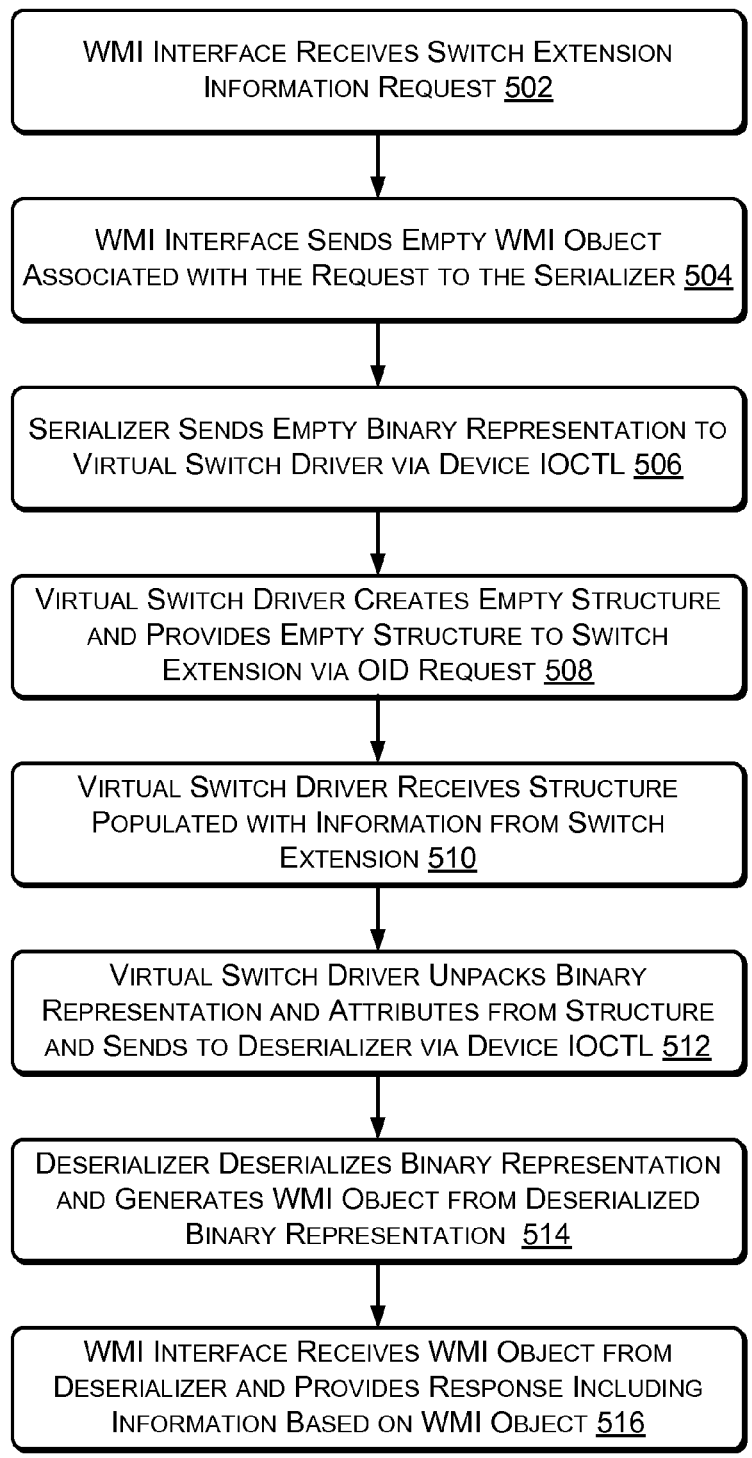
FIG. 5 is a flowchart showing an illustrative process for providing information associated with switch extensions in answer to requests for that information, in accordance with various embodiments.

FIGS. 3-5 are flowcharts showing operations of example processes. The operations of the processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 is a flowchart showing an illustrative process for applying persisted switch extension settings to a switch extension of a target virtual switch, in accordance with various embodiments. As illustrated at block 302, a root virtual machine of a host device may configure a switch extension of a virtual switch of the root virtual machine with one or more received settings. In some embodiments, the settings are received at a management interface, transformed and/or packaged, and provided to the switch extensions in the manner shown in FIG. 4 and described further below.

At block 304, in response to configuring the switch extension with the one or more settings, the root virtual machine persists the one or more settings. In some embodiments, a VMM service or other component of the root virtual machine persists the one or more settings by storing the one or more settings in a virtual machine configuration file.

At block 306, the persisted one or more settings are applied to a target switch extension of a target virtual switch. In some embodiments, the settings are applied as part of a configuration file during a live migration, repair, or back-up operation.

FIG. 4 is a flowchart showing an illustrative process for configuring a switch extension with settings received through a management interface, in accordance with various embodiments. As illustrated at block 402, a root virtual machine of a host device receives one or more settings of a switch extension of a virtual switch of the root virtual machine through a management interface, such as a WMI interface. The WMI interface may receive the settings as a WMI object that identifies a schema associated with the switch extension. The settings may be specified using a CIM MOF syntax and associated with a settings-specific base class. The schema may be a MOF file.

At block 404, the management interface provides the settings as a WMI object to a serializer component that serializes the WMI object into a binary format. In some embodiments, the serializing is based on the MOF file schema. In some embodiments, the serializer component is configured to serialize received objects associated with a specific base class. At block 406, the serializer component then provides the binary representation and attributes derived from the MOF file schema to driver of the virtual switch. The binary representation and attributes may be provided using a device IOCTL call.

At block 408, the virtual switch driver receives the binary representation of the settings and the attributes and packs them in a structure, such as a C structure, a NDIS structure, or another type of data structure. At block 410, upon packing the binary representation and the attributes in the structure, the virtual switch driver provides the structure to the switch extension. In some embodiments, the virtual switch driver provides the structure by making an OID request of the switch extension.

At decision block 412, the root virtual machine determines if the switch extension has been successfully configured with the settings. The root virtual machine may make the determination based on a response from the switch extension indicating success or failure. At block 414, if the response indicates success, a VMM service or other component of the root virtual machine persists the settings in the manner shown in FIG. 3 and described above with reference to that figure. If the response indicates failure, the operator providing the settings may be notified of the failure via the management interface, and the operator may retry providing the settings, as described above with reference to block 402.

FIG. 5 is a flowchart showing an illustrative process for providing information associated with switch extensions in answer to requests for that information, in accordance with various embodiments. As illustrated at block 502, a management interface of a root virtual machine of a host device, such as a WMI interface, receives a request for information associated with a switch extension. The information may include settings or performance metrics and the request may identify a schema, such as a MOF file, associated with the switch extension. At block 504, responsive to receiving the request, the management interface generates an empty object, such as an empty WMI object, and sends the empty WMI object to a serializer component. In some embodiments, the empty WMI object also includes an indication of the request type or of the specific information being requested.

At block 506, the serializer component generates an empty binary representation corresponding to the empty WMI object and sends the empty binary representation to a driver of the virtual switch. In one embodiment, the binary representation is provided to the driver via a device IOCTL call.

At block 508, the virtual switch driver creates an empty structure, such as an empty C structure, NDIS structure, or other data structure and provides the structure to the switch extension via an OID request.

At block 510, the virtual switch driver receives a structure in response to the OID request populated by the switch extension with the requested information in a binary representation. At block 512, the virtual switch driver unpacks the binary representation from the structure and also unpacks attributes associated with the switch extension. The attributes may have been derived from the schema or provided by the switch extension. The virtual switch driver then returns the unpacked binary representation and attributes to a deserializer component via a device IOCTL call.

At block 514, the deserializer component deserializes the binary representation, in some embodiments based on the attributes, generating a WMI object that includes the request information. The deserializer component then provides the WMI object to the management interface.

At block 516, the management interface responds to the request with the information based on the contents of the WMI object.

Example System Architecture

FIG. 6 is a block diagram of an example computer system architecture of a host computing device that includes the root virtual machine 102, a hypervisor, and one or more other virtual machines, in accordance with various embodiments. As shown, the host computing device 600 may comprise at least a memory 602 (including a cache memory) storing the root virtual machine 102, one or more other virtual machines 604, and hypervisor 606. In some embodiments, as mentioned above, the computing device implements a Hyper-V architecture with the root virtual machine 102 serving as the parent partition and the one or more other virtual machines 604 serving as child partitions. The hypervisor 606 may provide an interface between the hardware of the host computing device 600 and the virtual machines, including the root virtual machine 102 and the one or more additional virtual machines 604.

Memory 602 may store program instructions that are loadable and executable on the processor(s) 612 (described further below), as well as data generated during the execution of these programs. Depending on the configuration and type of computing device, memory 602 may be volatile (such as random access memory (RAM)) and/or non-volatile (such as read-only memory (ROM), flash memory, etc.). The computing device or server may also include additional removable storage 608 and/or non-removable storage 610 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 602 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The host computing device 600 may also include one or more processing units (or processor(s)) 612. The processor(s) 612 may be implemented as appropriate in hardware, software, firmware, or combinations thereof. Software or firmware implementations of the processor(s) 612 may include computer-executable or machine-executable instructions written in any suitable programming language to perform the various functions described. Processor(s) 612 may also or alternatively include one or more graphic processing units (GPUs).

The host computing device 600 may further contain communications connection(s) 614 that allow the host computing device 600 to communicate with a stored database, another computing device or server, user terminals, and/or other devices on a network. The host computing device 600 may also include input device(s) 616, such as a keyboard, mouse, pen, voice input device, touch input device, etc., and output device(s) 618, such as a display, speakers, printer, etc.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   configuring, by one or more computing devices, a switch extension associated with a virtual switch with one or more settings;
   in response to the configuring, persisting, by the one or more computing devices, the one or more settings in a configuration file on a root virtual machine; and
   applying, by the one or more computing devices, the persisted one or more settings to a target switch extension of a target virtual switch.

2. The method of claim 1, wherein the applying is performed as part of a live migration, back-up, or repair.

3. The method of claim 1, further comprising receiving the one or more settings via a management interface.

4. The method of claim 3, wherein the one or more settings are received as a Windows Management Instrumentation (WMI) object identifying a Managed Object Format (MOF) file providing a schema for the one or more settings.

5. The method of claim 1, wherein the configuring comprises serializing the one or more settings into a binary representation.

6. The method of claim 5, wherein the serializing comprises serializing the one or more settings based on an association of the one or more settings with a base class.

7. The method of claim 5, wherein the configuring further comprises providing the binary representation and attributes derived from a schema to a virtual switch driver of the virtual switch via a device input/output control (IOCTL) message.

8. The method of claim 7, wherein the virtual switch driver packages the binary representation and the attributes in a C structure, a Network Driver Interface Specification (NDIS) structure, or a data structure.

9. The method of claim 8, wherein the configuring comprises providing the packaged binary representation and attributes to the switch extension via an object identifier (OID) request.

10. The method of claim 1, wherein the persisting comprises updating a virtual machine configuration file responsive to a notification that the configuring was successful.

11. The method of claim 1, wherein the switch extensions are filter modules of a virtual stack of the virtual switch utilized in filtering traffic to or from a virtual machine of a host device that implements the virtual switch.

12. The method of claim 1, further comprising:
   receiving a request for information associated with the switch extension;
   providing a data structure associated with the request to the switch extension;
   receiving the data structure in return from the switch extension, the data structure populated with the requested information; and
   providing a response to the request that includes the requested information derived from the data structure.

13. The method of claim 12, further comprising deserializing a binary representation included in the data structure and generating a WMI object based on the deserialized binary representation.

14. A system comprising:
   one or more processors; and
   a plurality of components of a virtual machine implemented in the system and operated by the one or more processors, the components including:
      a management interface configured to receive a settings object, the management interface enabling specification of the settings object and identification of an schema associated with a switch extension of a virtual switch of the virtual machine;
      a serialization component configured to generate a binary representation of the settings object;
      a virtual switch driver of a virtual switch configured to package the binary representation and attributes derived from the schema into a C structure and provide the C structure to the switch extension to enable configuration of the switch extension with one or more settings included in the settings object, and
      a configuration file configured to persist the one or more settings.

15. The system of claim 14, wherein the virtual machine is a root virtual machine of a host device that includes at least the root virtual machine and a hypervisor to enable instantiation of additional virtual machines and communication with the additional virtual machines and/or the root virtual machine through the virtual switch.

16. One or more computer storage media comprising computer-executable instructions stored thereon and configured to program a computing device to perform operations including:

receiving, by a root virtual machine, a request for information associated with a switch extension of a virtual switch implemented on the computing device;

providing, by the root virtual machine, a data structure associated with the request to the switch extension;

receiving, by the root virtual machine, the data structure in return from the switch extension, the data structure populated with the requested information; and providing, by the root virtual machine, a response to the request that includes the requested information derived from the data structure.

17. The one or more computer storage media of claim 16, wherein the data structure is one of a C structure or an NDIS structure.

18. The one or more computer storage media of claim 16, wherein the operations further include deserializing a binary representation included in the data structure and generating a WMI object based on the deserialized binary representation.

19. The one or more computer storage media of claim 18, wherein the operations further include providing the WMI object to a WMI interface to enable the WMI interface to generate and provide the response.

20. The one or more computer storage media of claim 16, wherein the requested information includes one or more of settings or performance metrics associated with the switch extension.

* * * * *